(12) United States Patent
Ko et al.

(10) Patent No.: US 11,102,971 B2
(45) Date of Patent: Aug. 31, 2021

(54) SLIM INSECT TRAP USING UV LED

(71) Applicant: Seoul Viosys Co., Ltd., Ansan-si (KR)

(72) Inventors: Mi So Ko, Ansan-si (KR); Chung Hoon Lee, Ansan-si (KR); Hoon Sik Eom, Ansan-si (KR); Sang Hyun Chang, Ansan-si (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 483 days.

(21) Appl. No.: 16/101,389

(22) Filed: Aug. 10, 2018

(65) Prior Publication Data

US 2018/0368383 A1  Dec. 27, 2018

Related U.S. Application Data

(63) Continuation of application No. PCT/KR2017/001465, filed on Feb. 10, 2017.

(30) Foreign Application Priority Data

Feb. 11, 2016 (KR) .......... 10-2016-0015573
May 18, 2016 (KR) .......... 10-2016-0061015
Feb. 9, 2017 (KR) .......... 10-2017-0018281

(51) Int. Cl.
*A01M 1/08* (2006.01)
*A01M 1/06* (2006.01)
*A01M 1/02* (2006.01)

(52) U.S. Cl.
CPC .............. *A01M 1/08* (2013.01); *A01M 1/023* (2013.01); *A01M 1/06* (2013.01)

(58) Field of Classification Search
CPC ............ A01M 1/08; A01M 1/06; A01M 1/04; A01M 1/023; F21V 5/04; F21S 41/26
See application file for complete search history.

(56) References Cited

U.S. PATENT DOCUMENTS 1,807,550 A * 5/1931 Rector .................... A01M 1/08
                                                       43/139
2,807,116 A * 9/1957 Finley .................... A01M 1/08
                                                       43/139

(Continued)

FOREIGN PATENT DOCUMENTS

EP        0746977 A1 * 12/1996 ............. A01M 1/08
JP      11-056194 A      3/1999
(Continued)

OTHER PUBLICATIONS

Machine translation of KR 200425478 to Song, published Sep. 2006.*
Machine translation of KR 200332379 to Im, published Nov. 2003.*
Machine translation of JP 2011204445 to Koike, published Oct. 2011.*
International Search Report dated Apr. 20, 2018 in International Application No. PCT/KR2017/001465, 2 pages.

*Primary Examiner* — Kathleen I Alker
(74) *Attorney, Agent, or Firm* — Perkins Coie LLP

(57) ABSTRACT

The present invention relates to an insect trap for attracting insects using a UV LED and sucking and capturing the attracted insects with a fan. The insect trap of the present invention comprises: a body; a suction part provided on one side of the body; a fan installed behind the suction part; at least one UV LED, provided on the body at least around the fan, for irradiating ultraviolet rays forward; a discharge part for discharging air sucked in by the suction part in a direction different from the air suction direction of the suction part; a duct which is an air passage from the suction part to the discharge part; a first streamlined inner surface, provided on an inner wall side opposite to a direction in which the duct extends on the basis of the suction part, for guiding air sucked into the suction part toward the duct; and an insect net, installed in the discharge part, for passing the air therethrough and capturing insects being sucked in together with the air.

17 Claims, 13 Drawing Sheets

(56) References Cited

U.S. PATENT DOCUMENTS

| | | | | |
|---|---|---|---|---|
| 3,020,671 | A | * 2/1962 | Potter | A01M 1/08 43/139 |
| 4,127,961 | A | * 12/1978 | Phillips | A01M 1/08 43/113 |
| 5,323,556 | A | * 6/1994 | Carle | A01M 1/08 43/113 |
| 6,871,445 | B2 | * 3/2005 | Bertani | A01M 1/08 43/139 |
| 2002/0020105 | A1 | 2/2002 | Sharpe | |
| 2004/0148846 | A1 | * 8/2004 | Moore | A01M 1/08 43/113 |
| 2004/0148848 | A1 | 8/2004 | Bertani | |
| 2010/0178042 | A1 | * 7/2010 | Neumann | A01M 1/2077 392/386 |
| 2016/0174539 | A1 | * 6/2016 | Lee | A01M 1/08 43/112 |
| 2016/0212984 | A1 | * 7/2016 | Fang | A01M 1/08 |

FOREIGN PATENT DOCUMENTS

| | | | | |
|---|---|---|---|---|
| JP | 2011204445 | A * | 10/2011 | G02B 19/0061 |
| KR | 200332379 | Y1 * | 11/2003 | A01M 1/08 |
| KR | 200402319 | Y1 * | 11/2005 | A01M 1/08 |
| KR | 200425478 | Y1 * | 9/2006 | A01M 1/24 |
| KR | 20080057391 | A * | 6/2008 | A01M 1/08 |
| KR | 10-2009-0001406 | A | 1/2009 | |
| KR | 20090009595 | A * | 1/2009 | A01M 1/02 |
| KR | 20100009816 | A * | 1/2010 | A01M 1/08 |
| KR | 101253467 | B1 * | 4/2013 | A01M 1/24 |
| KR | 20130115963 | A * | 10/2013 | A01M 1/08 |
| KR | 10-2015-0112755 | A | 10/2015 | |
| WO | WO-2014134371 | A1 * | 9/2014 | A01M 1/14 |

\* cited by examiner

SLIM INSECT TRAP USING UV LED

TECHNICAL FIELD

The present invention relates to an insect trap and, more particularly, to an insect trap which attracts insects using a UV LED and sucks in and traps the attracted insects using a fan.

BACKGROUND ART

Recently, the population of insect pests has been increasing due to climatic and social influences such as global warming and eco-friendly policies. In addition to damaging crops and livestock, insect pests can also affect humans by transmitting pathogens such as malaria, dengue fever, and Japanese encephalitis. Therefore, there is continuous demand for deinsectization of the surrounding living environment, and accordingly, deinsectization-related industries are also growing.

Conventionally, there have been proposed chemical control using pesticides, biological control using loaches or the like, physical control that attracts insect pests using a blacklight trap, carbon dioxide, or the like, followed by application of high voltage to kill the insect pests, and environmental control that improves the surrounding environment by eliminating water puddles in which larvae of insects can grow. However, chemical control has a problem of secondary pollution, and biological control or environmental control has a problem of high cost and much time and effort. In addition, physical control using an insect trap or the like has a problem in that device configuration is complicated, causing deterioration in ease of use, desired trapping efficacy cannot be secured, and device cost is relatively high.

UV light sources have been used for medical purposes such as sterilization, disinfection and the like, analytical purposes such as analysis based on changes in radiated UV light, industrial purposes such as UV curing, cosmetic purposes such as UV tanning, and other purposes such as insect trapping, counterfeit money detection, and the like.

Examples of a typical UV lamp used as such UV light sources include mercury lamps, excimer lamps, and deuterium lamps. However, such typical UV lamps all have problems of high power consumption and heat generation, short lifespan, and environmental pollution due to toxic gas used in the lamps.

As an alternative to overcome the above-described problems of typical UV lamps, UV LEDs have attracted attention. UV LEDs are advantageous in that the UV LEDs have low power consumption and cause no environmental pollution. However, the production cost of LED packages that emit light in the UV range is considerably higher than the production cost of LED packages that emit light in the visible range, and various products using UV LED packages have not been developed since the characteristics of UV light are quite different from the characteristics of light in the visible range.

In addition, there are limits in replacement of typical UV lamps with UV LEDs due to differences in light-emission characteristics therebetween. A typical UV lamp provides surface emission and radiates light in all directions, whereas a UV LED provides spot emission and radiates light in one direction. Thus, depending upon application, it is necessary to consider the difference between a UV lamp and a UV LED when replacing the UV lamp with the UV LED. For example, a UV light source used in an insect trap is configured to radiate UV light a full 360 degrees around the insect trap and thus needs to be designed to meet this requirement.

As described above, a UV LED radiates light in one direction and thus is suitable for a wall-mounted insect trap, which faces in one direction. On the other hand, in order to catch insects lured therearound, typical insect traps using a UV light source radiating UV light a full 360 degrees generally employ a method in which an air flow is generated by a circular fan such that the insects are drawn into the air flow and trapped in a trapping unit. Due to the emission characteristics of the typical UV lamp and the shape of the circular fan, almost all insect trap products include a cylindrical body designed to allow the circular fan to be mounted thereon.

However, such a cylindrical body is not suitable for a wall-mounted insect trap as described above. Although a body having a cuboid box shape may be considered in order to solve such a problem, the circular fan is not suitable for such a body. However, the circular fan can provide high air-flow rate and high suction force even at low rpm and thus is very effective in trapping insects while minimizing generation of noise. Therefore, there is a need for a solution by which such a circular fan can be used in a wall-mounted insect trap.

DISCLOSURE

Technical Problem

Embodiments of the present invention have been conceived to solve such a problem in the art and it is one aspect of the present invention to provide an insect trap which includes a body shaped to be mounted on a wall while enabling use of a circular fan.

It is another aspect of the present invention to provide an insect trap which has a slim structure to be mounted on a wall in a space-saving manner.

It is a further aspect of the present invention to provide an insect trap which can be easily mounted on a wall.

It is yet another aspect of the present invention to provide an insect trap which is portable when traveling.

It is yet another aspect of the present invention to provide an insect trap which can significantly reduce noise generated by a fan even when used indoors.

It is yet another aspect of the present invention to provide an insect trap which includes a photocatalyst to sterilize and deodorize air around the insect trap and to generate carbon dioxide, which is highly effective in attracting insect pests, particularly mosquitoes.

It is yet another aspect of the present invention to provide an insect trap which includes support legs movable on an outer peripheral surface of a body such that the insect trap can be installed in various forms depending on installation conditions, thereby improving pest trapping efficacy.

It is yet another aspect of the present invention to provide an insect trap which includes a cross fan to generate a hydrodynamically efficient air flow inside a duct, thereby improving pest trapping efficacy.

It is yet another aspect of the present invention to provide an insect trap which includes a mesh cylinder that surrounds a cross fan to prevent insect pests from sticking to the cross fan, thereby improving durability of a motor while minimizing generation of noise.

Technical Solution

The present invention provides an insect trap which includes a circular fan disposed on one surface of a cuboid body to face in a forward direction and has an internal structure capable of preventing deterioration in flow efficiency due to a slim internal space of the body.

In addition, the present invention provides an insect trap which is provided with a power connector having a plug, wherein the power connector is detachably mounted on the insect trap.

Further, the present invention provides an insect trap which can prevent a person from being directly irradiated with UV light therefrom when used indoors.

Moreover, the present invention provides an insect trap which uses a UV LED emitting UV light with a peak wavelength of 360 nm to 370 nm and further includes a lens disposed in front of the UV LED to convert light from the UV LED into surface light.

Specifically, in accordance with one aspect of the present invention, there is provided an insect trap including: a body; a suction portion formed through one surface of the body; a fan disposed behind the suction portion; at least one UV LED disposed on the body at least around the fan; a discharge portion through which air taken into the body through the suction portion is discharged in a direction different from an air suction direction of the suction portion; a duct defining an air flow path from the suction portion to the discharge portion; a first streamlined inner surface extending from a side of an inner wall of the body opposite an extension direction of the duct with respect to the suction portion at least to a portion of the inner wall corresponding to a rotation center of the fan, the first streamlined inner surface guiding the air taken into the body through the suction portion toward the duct; and an insect net provided to the discharge portion to allow air to pass therethrough while allowing insects sucked in along with air to be caught thereby.

The insect trap may further include: at least one streamlined guide vane disposed at a predetermined distance from the first streamlined inner surface in the extension direction of the duct, wherein the streamlined guide vane may be configured to divide and guide air taken into the body through the suction portion.

The insect trap may further include: a second streamlined inner surface formed at a side of the inner wall of the body opposite the first streamlined inner surface to guide air taken into the body through the suction portion toward the duct.

A suction surface of the fan may face in a forward direction or may be tilted at an angle of 30 degrees or less with respect to the forward direction.

A motor for driving the fan may be disposed on the suction surface of the fan.

Alternatively, the motor for driving the fan may be disposed behind the fan with respect to the suction portion located in front of the fan.

The insect trap may further include: a shielding surface disposed around the UV LED to prevent UV light emitted from the UV LED from directly traveling downward.

The UV LED may emit UV light with a peak wavelength of 360 nm to 370 nm.

The insect trap may further include: a lens disposed in front of the UV LED to allow UV light from the UV LED to be radiated over a wider angle in a horizontal direction of the UV LED than in a vertical direction of the UV LED.

The body may be provided with a power connector having a plug, wherein the plug is movable between a position at which the plug is embedded in the body and a position at which the plug extends rearward of the body.

The power connector may be detachably mounted on the body.

The body may be provided with an electric connection configured to be connected to an extension cable for connection between the power connector and a power source.

A circuit controlling operation of the UV LED and the fan may be disposed in a space located alongside the duct between the suction portion and the insect net.

At least one of the first streamlined inner surface and the second streamlined inner surface may contain a photocatalyst, wherein the insect trap may further include a UV LED emitting light toward the photocatalyst.

The insect trap may further include: support legs supporting the body; and a guide rail formed on an outer surface of the body to guide the support legs.

The fan may be a cross fan.

The insect trap may further include a mesh cylinder surrounding the cross fan and having a plurality of pores.

Advantageous Effects

According to the present invention, it is possible to provide a slim, quiet insect trap which uses a circular fan to provide high air flow efficiency and can be easily mounted on a wall.

According to the present invention, it is possible to provide a slim, quiet insect trap which uses a streamlined inner wall and a streamlined guide vane to guide an air flow generated by a circular fan having a larger cross-sectional flow area towards a duct formed inside a slim body and having a smaller cross-sectional flow area, thereby significantly reducing backflow of air or noise due to pressure differences behind the fan.

In addition, the insect trap according to the present invention can be easily mounted on a wall simply by putting a plug provided to one surface (for example, back surface) of the insect trap into a receptacle mounted on an upper portion of the wall.

Further, the insect trap according to the present invention can be easily installed under various installation conditions using a replaceable plug and an extension cable and is portable when travelling.

Moreover, the insect trap according to the present invention can exhibit improved insect trapping efficacy using a UV LED that emits UV light having peak intensity at a wavelength providing maximum insect luring efficacy.

In addition, the insect trap according to the present invention uses a photocatalyst to deodorize and sterilize air therearound and to allow deodorization and sterilization to be achieved over a wider area through an air flow generated by the fan, while improving insect luring efficacy through carbon dioxide generated by a photocatalytic reaction of the photocatalyst.

In addition, the insect trap according to the present invention includes support legs supporting the body and configured to be movable along a guide rail and thus can be installed in various forms depending on installation conditions, thereby exhibiting improved insect trapping efficacy.

In addition, the slim and space-saving insect trap according to the present invention can generate a hydrodynamically efficient air flow inside a duct using a cross fan, thereby exhibiting improved insect trapping efficacy.

In addition, the insect trap according to the present invention can prevent insects from sticking to the cross fan using a mesh cylinder surrounding the cross fan, thereby improving durability of a motor or minimizing generation of noise.

These and other advantages of the present invention will become apparent from the detailed description of the following embodiments in conjunction with the accompanying drawings.

BEST MODE

Figure 1:
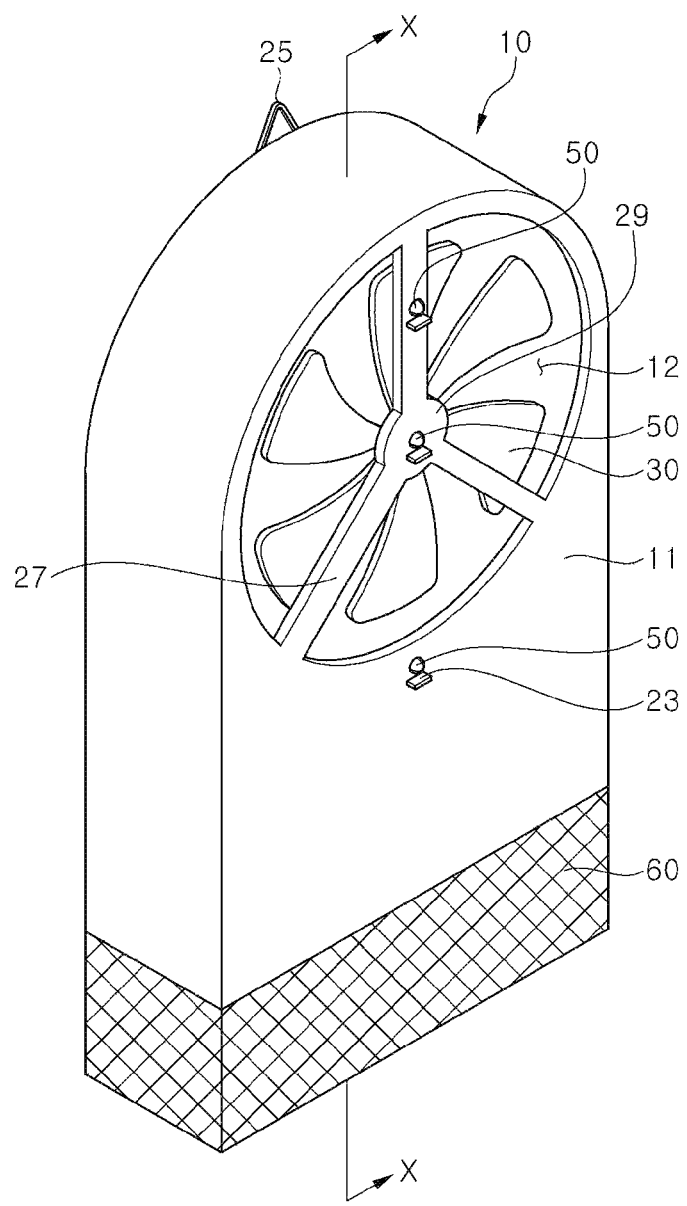
FIG. 1 is a perspective view of an insect trap according to a first embodiment of the present invention.

It should be understood that the present invention may be embodied in different ways and is not limited to the following embodiments, which are provided for complete disclosure and thorough understanding of the present invention by those skilled in the art.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Like components will be denoted by like reference numerals throughout the specification. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

As used herein, the term "disposed" means that one component is located at another component, and may include the case in which one component is simply placed at another component and the case in which one component is integrated with another component through application or coating.

Figure 2:
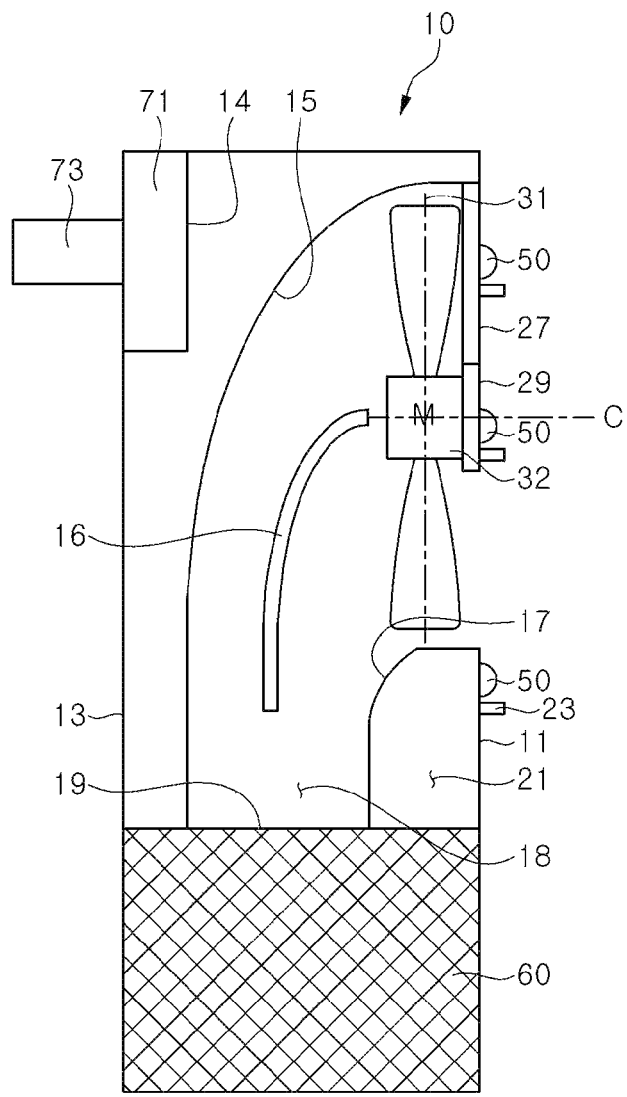
FIG. 2 is a sectional view taken along line X-X of FIG. 1.

FIG. 1 is a perspective view of an insect trap according to a first embodiment of the present invention and FIG. 2 is a sectional view taken along line X-X of FIG. 1.

An insect trap according to the present invention includes a body 10 defining an external appearance of the insect trap and having a small thickness in a front-rear direction thereof. The slim body 10 may have at least one planar surface, for example, two opposite surfaces 11, 13, specifically, a front surface 11 and a back surface 13.

The insect trap includes a circular air suction portion 12 formed through an upper portion of the front surface 11 and a fan 30 disposed in the suction portion 12. The fan 30 may be any circular rotary fan commonly used in the art and includes vanes radially extending from a rotary shaft thereof. In order to increase suction force of such a rotary fan, a method of increasing the size of the fan or a method of increasing the rpm of the fan may be considered. In order to make the insect trap portable, the fan preferably has a diameter of about 10 cm to about 20 cm. Within this range, when used to suck in attracted insects, the fan can exhibit the desired effects even at low rpm and thus generate less noise.

A motor 32 is disposed at the center of the fan to provide torque to the fan. Here, the motor is secured to a center support 29 disposed at the center of the suction portion 12 by a plurality of support bars 27 (three support bars in FIG. 1) directly or indirectly secured to the body 10. When the fan 30 is rotated by the motor 32, air outside the body 10 is drawn into the body 10 through the suction portion 12.

At least one UV LED 50 emitting UV light forward is disposed in the vicinity of the suction portion 12. The UV LED 50 may emit UV light with a peak wavelength of 360 nm to 370 nm, specifically with a peak wavelength of 365 nm. In FIG. 1, the UV LED 50 is shown as disposed at a portion of the front surface 11 around the suction portion, a portion of the support bar 27, and at a portion of the center support 29. The UV LED 50 is provided thereunder with a shielding surface 23 slightly protruding forward. The shielding surface 23 serves to prevent UV light from the UV LED from traveling downward. When the insect trap is installed indoors, a person staying in that place for a long time can experience unexpected side effects due to exposure to UV light. The shielding surface 23 can minimize such side effects. The shielding surface 23 may be integrally formed with a member constituting the front surface 11.

The body 10 is provided therein with a duct 18, as shown in FIG. 2. The duct 18 defines an air flow path through which air having been taken in through the suction portion 12 flows to a discharge portion 19. According to the present invention, the axial direction of the rotary shaft of the fan or the air suction direction of the suction portion 12 crosses or does not correspond to an air discharge direction of the discharge portion 19. That is, the suction portion 12 faces forward, whereas the discharge portion 19 faces downward.

An insect net 60 is disposed under the discharge portion 19. The insect net 60 may be provided in the form of an insect screen that is permeable to air and impermeable to insects. The insect net 60 is detachably mounted on the bottom of the body 10. When the insect net 60 is filled with insects to some degree, the insect net 60 may be separated from the body so as to remove the insects from the insect net 40.

Referring to the duct 18 again, since the air suction direction and the air discharge direction cross each other, the duct 18 has a streamlined inner wall to provide a smooth air flow. Specifically, in order to guide air taken into the body through the front surface to naturally flow downward, a first streamlined inner surface 15 is formed on an inner wall of the body 10 opposite the extension direction of the duct. Air taken into the body through a portion of the suction portion above the height C of the center of the fan is guided by the first streamlined inner surface 15 to change the flow direction thereof downwards. The first streamlined inner surface 15 may extend downward from an upper end of the inner wall of the body at least to a portion of the inner wall of the body below the height C of the center of the fan.

However, if the body is formed in a slim structure such that the distance between the front surface and the back surface is considerably smaller than the diameter of the suction portion, the first streamlined inner surface 15 is not enough to smoothly switch the air flow direction. That is, when the body has a slim structure, it is difficult to extend the first streamlined inner surface 15 such that the shape of the first streamlined inner surface 15 covers a portion of the suction portion below the height C of the center of the fan. In this case, air taken into the body through a portion of the suction portion below the height C of the center of the fan collides with a non-streamlined inner wall portion. As a result, loud noise is generated, flow loss occurs, and air is likely to flow back upward. In other words, since the amount of air flow at a portion of the inner space of the body below the height C of the center of the fan is larger than that at a portion of the inner space of the body above the height C of the center of the fan, the pressure inside the body is not uniform, thereby causing back flow of air and thus energy loss and noise.

According to the present invention, a guide vane 16 having a similar shape to the first streamlined inner surface 15 is disposed at a predetermined distance from the first streamlined inner surface 15. Although one guide vane 16 is shown in FIG. 2, it should be understood that the present invention is not limited thereto and two or more guide vanes 16 may be disposed at predetermined distances from the first streamlined inner surface 15 to be separated from each other. The number of guide vanes may vary depending on the diameter of the fan, the flow rate of air generated by the fan, and the like.

With the guide vane 16, air taken into the body through a portion of the suction portion below the height C of the center of the fan can also naturally change the flow direction thereof along the streamlined surface of the guide vane 16. The guide vane 16 may extend downward such that change of the flow direction thereof can be easily achieved.

In addition, in order to further facilitate air flow, the body may be further provided with a second streamlined inner surface 17 on an inner surface thereof opposite the first streamlined inner surface 15. The second streamlined inner surface 17 allows air taken in near a lower end of the fan to naturally change the air flow direction downward.

In this way, the streamlined inner surfaces 15, 17 and the guide vane 16 allow air to flow downward along the duct 18 before being discharged through the discharge portion 19 without causing flow loss. As air having passed through the discharge portion is discharged outside the insect net 60, bugs or insects in the air are caught by the insect net 60. Referring to FIG. 2, the duct 18 has a smaller cross-sectional flow area than the suction portion 12, such that air flows faster in the duct 18 than in the vicinity of the suction portion 12. That is, air pressure inside the duct 18 is lower than air pressure in the vicinity of the suction portion 12. Accordingly, air drawn into the body by the fan disposed in the suction portion 12 can be accelerated when flowing through the duct 18, thereby further improving insect trapping efficacy. With the structure of the body 10 in which the duct 18 has a smaller cross-sectional area than the suction portion 12 in which the fan 30 is disposed, it is possible to maximize insect trapping efficacy while making the body slim. In addition, once being drawn into the body and caught by the insect net 60, insects cannot ascend and escape through the duct 18 in which air flows at a relatively high speed, so long as the fan 30 rotates, even though at low rpm.

For example, in the case of a typical insect trap having a structure in which a duct vertically extends, a rotary shaft of a fan is vertically disposed above the duct, and vanes of the fan are horizontally arranged, it is impossible to make a body thinner than the diameter of the fan due to the horizontal placement of the fan and it is not expected that an air flow in the duct will be accelerated unless the duct is provided in the form of a Venturi tube. Conversely, with the structure in which the rotary shaft of the fan 30 is horizontally disposed on the front surface of the body, which is much wider than the distance between the front and back surfaces of the body, and the vanes of the fan are vertically arranged while the distance between the front surface 12 and the back surface 13 is reduced to make the duct slim and thus making the body 10 slim, the insect trap according to the present invention can have a slim and beautiful appearance while exhibiting further improved insect trapping efficacy.

For the insect trap according the present invention, since lots of components are placed in a restricted space, efficient space utilization is required. Each of the fan and the UV LED according to the present invention requires a related control circuit and a power circuit for controlling external power supply thereto. In the present invention, the control circuit or the power circuit may be accommodated in a space 21 which is located alongside the duct between the fan 30 and the insect net.

A power connector for the insect trap is disposed at an upper portion of the back surface 13 of the body. The power connector includes a frame 71 secured to the body 10 and a plug 73 protruding rearward from the frame. The frame 71 may be detachably mounted on the body 10. Accordingly, the power connector may be provided to the body using the frame 71 adapted to the plug shape varying from country to country. With the plug located at the upper portion of the back surface of the insect trap, installation of the insect trap can be completed simply by putting the plug 73 into a receptacle mounted at an upper portion of a wall. In case of absence of such a receptacle, an extension cable for power connection, described below, may be further provided. In addition, a hanger loop 25 for wall mounting may be further disposed at the upper portion of the body.

Figure 3:
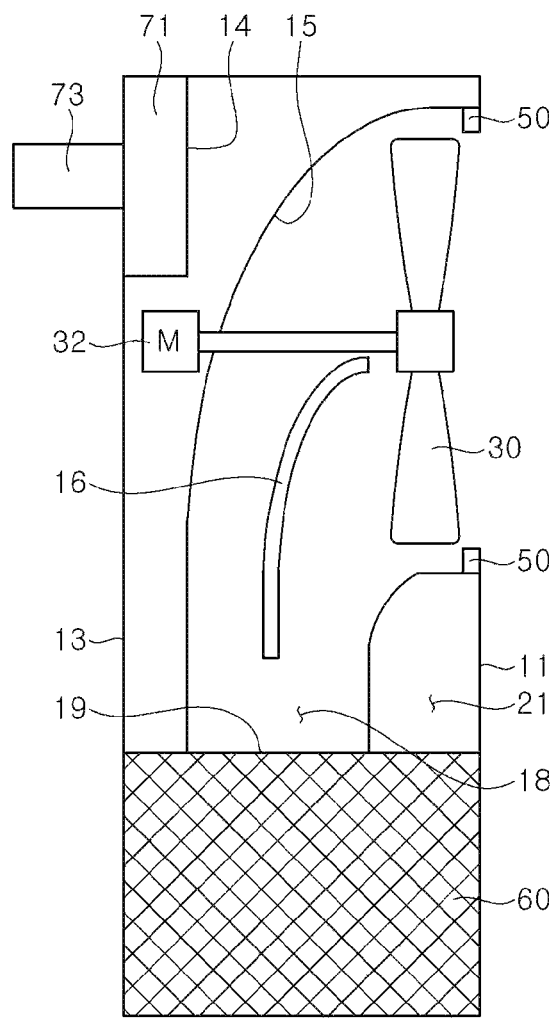
FIG. 3 is a sectional view of an insect trap according to a second embodiment of the present invention.

FIG. 3 is a sectional view of an insect trap according to a second embodiment of the present invention.

Unlike in the insect trap according to the first embodiment, in an insect trap according to the second embodiment, the support bars 27 and the center support 29 in the suction portion are omitted and, instead, the motor 32 is disposed at a side of the back surface 13 of the body 10. With this structure in which the support bars 27 and the center support 29, which act as a resistance to air flow, are eliminated, air flow efficiency can be further improved.

In addition, in the insect trap according to the second embodiment, the UV LED 50 is disposed around the suction portion 12 without protruding outward from the front surface 11. With this structure, the shielding surface 23 described in the first embodiment can be omitted, thereby further improving the appearance of the front surface of the insect trap.

Figure 4:
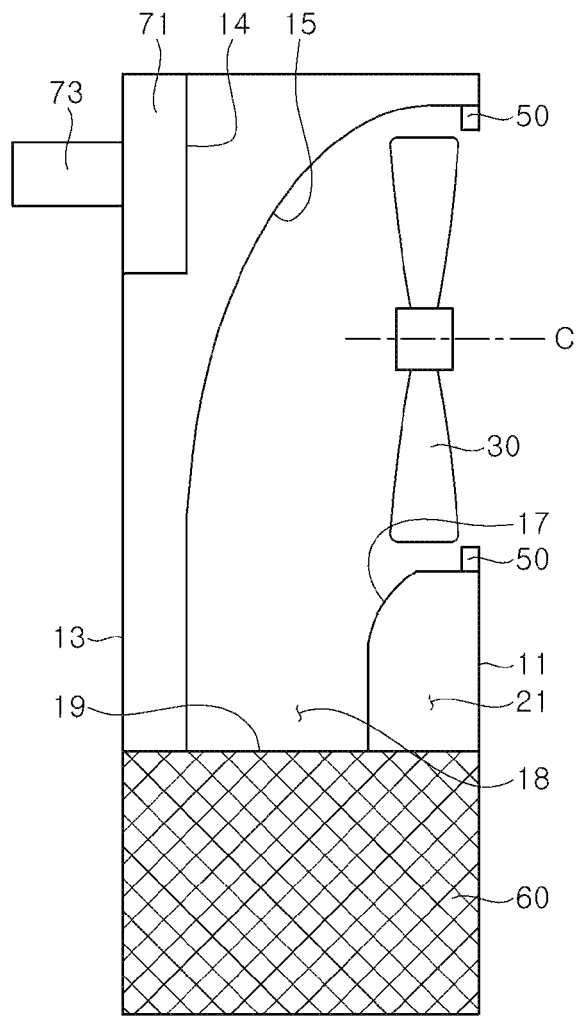
FIG. 4 is a sectional view of an insect trap according to a third embodiment of the present invention.

FIG. 4 is a sectional view of an insect trap according to a third embodiment of the present invention. In comparison with the insect trap according to the second embodiment, an insect trap according to the third embodiment is characterized in that the guide vane 16 is omitted and the second streamlined inner surface 17 is formed to have a relatively large area to enlarge the inner space and cross-sectional flow area of the duct. Further, in comparison with the insect traps according to the first and second embodiments, the insect trap according to the third embodiment is characterized in that the guide vane 16 is omitted to simplify the product structure and the first streamlined inner surface 15 further extends downward such that air taken into the body through a portion of the suction portion below the height C of the center of the fan can naturally flow downward along the first streamlined inner surface to some degree. This structure may be employed, for example, when there is no significant pressure difference between above and below the height C of the center of the fan due to low rpm of the fan, or when the thickness of the body in the front-rear direction can be slightly further increased.

Figure 5:
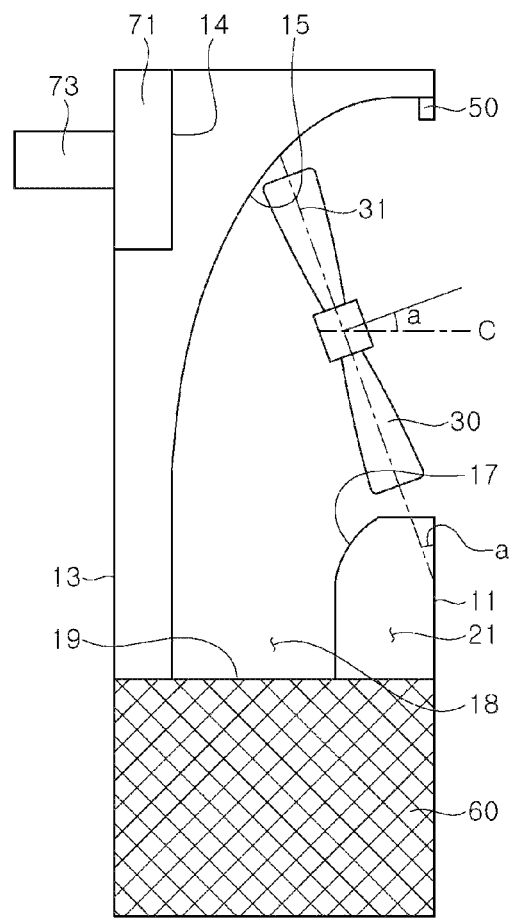
FIG. 5 is a sectional view of an insect trap according to a fourth embodiment of the present invention.

FIG. 5 is a sectional view of an insect trap according to a fourth embodiment of the present invention.

An insect trap according to the fourth embodiment differs from the insect trap according to the third embodiment in that the fan 30 is disposed to face slightly upward. When the fan 30 is tilted at an angle of a to face upward, a pressure difference between above and below the height C of the center of the fan becomes smaller, whereby a flow of air can be guided without flow loss. Here, the angle a may be set to any value so long as the value does not make it impossible the body of the insect trap to have a slim shape. For example, the angle a may be less than or equal to 30 degrees.

Figure 6:
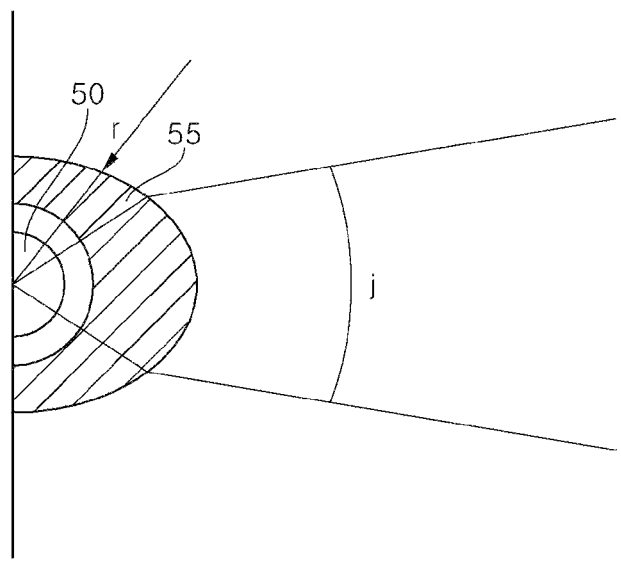
FIG. 6 is a side view of a UV LED used as a light source of an insect trap according to the present invention, the UV LED being in use.
Figure 7:
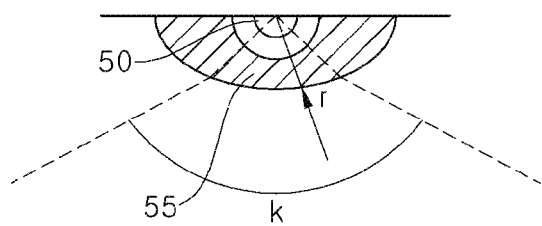
FIG. 7 is a plan view of the UV LED of FIG. 6.

FIG. 6 is a side view of a UV LED used as a light source of an insect trap according to the present invention, the UV LED being in use, and FIG. 7 is a plan view of the UV LED.

The UV LED according to the invention is a spot light source and emits light over an angle of about 120 degrees.

Preferably, the insect trap according to the invention is mounted at an upper portion of a wall such that a person indoors can be prevented from being irradiated with UV light while allowing UV light to be radiated over a wide range of areas. Accordingly, it is desirable that light from the UV LED be radiated over a wider angle in the horizontal direction and over a narrower angle in the vertical direction.

For this purpose, according to the present invention, the UV LED is provided in front thereof with a lens that allows light from the UV LED to be radiated over a wider angle in the horizontal direction and to be radiated over a narrower angle in the vertical direction. Referring to FIG. 6 and FIG. 7, the lens 55 according to the invention is disposed in front of the UV LED 50, wherein a light entering surface of the lens 55 (i.e., a surface of the lens facing the UV LED) has a hemispherical shape centered on the center of the UV LED to minimize reflection of UV light incident on the lens. In addition, referring to FIG. 6, a light exiting surface of the lens (i.e., a surface of the lens facing forward) has a curved shape with a radius r increasing from upper and lower ends of the lens toward the height of the middle of the lens to allow light from the UV LED to be deflected forward as much as possible. In other words, the lens 55 allows light from the UV LED 50 to be radiated over an angle j of less than 120 degrees in the vertical direction. Further, referring to FIG. 7, the light exiting surface of the lens has a curved profile with a radius r gradually decreasing from right and left ends of the lens toward the front center of the lens to allow UV light from the UV LED 50 to be diffused widely as much as possible in the horizontal direction. In order words, the lens 55 allows light from the UV LED 50 to be radiated over an angle k of more than 120 degrees in the horizontal direction.

Preferably, the lens is formed of a material having high UV transmittance and UV resistance. For example, the lens may be formed of quartz, PMMA (monomer content: 80% or more), or a fluorine-based synthetic resin (e.g., Teflon manufactured by DuPont). In addition, the outer surface of the secondary lens 55 may be roughened by sandblasting or the like to more effectively convert light from the UV LED into planar light.

A wavelength of UV light emitted from the UV LED 50 may be appropriately selected depending on the kind of target insects. Unlike typical UV lamps, the UV LED 50 emits UV light with a narrow spectral line half-width and thus can allow the intensity of UV light to be concentrated near a peak wavelength while enabling precise control over the peak wavelength, thereby exhibiting significantly improved insect trapping efficacy.

It was experimentally confirmed that the UV LED has higher insect attraction efficacy than a typical UV lamp.

The following is the result of an insect trapping test using an insect trap equipped with a UV LED and an insect trap equipped with a typical commercially available blacklight (BL) lamp under the same conditions. Specifications of the two light sources are shown in Table 1.

TABLE 1

|  | Voltage (V) | Current (A) | Power (W) | PF | Peak wavelength (Wp, nm) | Spectrum half-width (Fw, nm) | Radiant flux ($\Phi$ e, mW) | $\Phi$ v (lm) |
| --- | --- | --- | --- | --- | --- | --- | --- | --- |
| UV LED | 220.1 | 0.034 | 4.98 | 0.66 | 367.94 | 9.24 | 759.19 | 5.7 |
| Blacklight lamp | 220.1 | 0.247 | 6.4 | 0.12 | 365.88 | 18.36 | 528.8 | 8.37 |

Although both of the light sources had similar peak wavelengths of about 365 nm, the UV LED had a spectral line half-width of one half that of the BL lamp and a luminosity of 133 mW/lm, which was more than twice as high as that of the BL lamp (63 mW/lm).

The test was conducted twice in an outdoor barn, and the number (trap index) of insects trapped overnight was as follows.

TABLE 2

| Species | Vector disease | Trap index B/L | Trap index UV LED | Mean trap rate (%) (standard deviation) B/L | Mean trap rate (%) (standard deviation) UV LED |
|---|---|---|---|---|---|
| Aedes vexans | West Nile Fever | 1 0 | 7 0 | 12.5 (—) | 87.5 (—) |
| Anopheles sinensis | Malaria | 296 316 | 1,028 2,500 | 16.8b (7.9) | 83.2a (7.9) |
| Culex pipiens | West Nile Fever | 118 104 | 497 536 | 17.8b (2.1) | 82.2a (2.1) |
| Cx. tritaeniorhynchus | J. Encephalitis | 687 452 | 3,307 3,196 | 14.8b (3.4) | 85.2a (3.4) |
| Mansonia uniforms | | 145 80 | 269 368 | 26.5b (12.1) | 73.5a (12.1) |
| Total | | 1,247 952 | 5,108 6,600 | 16.1b (4.9) | 83.9a (4.9) |

As can be seen from the results, the UV LED insect trap had trapping efficacy more than 5 times as high as that of the typical BL lamp insect trap. This is thought to be due to the fact that a UV LED has a much narrower spectral line half-width than a typical UV lamp and thus can emit UV light in a desired wavelength range in a concentrated manner and light emitted from the UV LED has directivity and thus can be concentrated in a target area.

The UV LED 50 according to the present invention emits UV light with a peak wavelength of 365 nm. Although UV light in the UVA range is known to be able to attract insects, it is not known exactly which wavelengths in the UVA range are particularly effective in attracting insects. Indeed, a lamp emitting UV light in the UVA region attracts more insects than a lamp emitting UV light outside the UVA region. However, since a UV LED has a much narrower spectral line half-width than a UV lamp, it is necessary to determine at which peak wavelength UV light is more effective in attracting insects.

For this purpose, a paired test was conducted in which two Luralite traps (radiant flux: 500 mW) equipped with a UV LED emitting UV light with a peak wavelength of 340 nm and a UV LED emitting UV light with a peak wavelength of 365 nm, respectively, (wherein light from each of the light sources was converted into planar light) were used to trap houseflies.

A housefly trapping rate was determined by measuring the number of houseflies caught in each trap among a total of 50 houseflies. Here, the test was conducted inside a screened enclosure (1.8 m×3.7 m×1.8 m) in a dark laboratory. In addition, the houseflies were exposed to UV light from both of the Luralite traps at 26±1° C. and 64±4% RH for 1, 2, 4, 8, and 12 hours from morning, and there were two replicates in total under the same conditions except that the positions of the traps were exchanged.

TABLE 3

| | Mean cumulative trap rate and standard deviation (%) | | |
|---|---|---|---|
| Exposure time (hour) | Peak wavelength: 365 nm (radiant flux: 500 mW, UV converted into surface light) | Peak wavelength: 340 nm (radiant flux: 500 mW, UV converted into surface light) | Total |
| 1 | 11.0 ± 1.4a1) | 3.0 ± 1.4a | 14.0 ± 0.0 |
| 2 | 23.0 ± 4.2a | 5.0 ± 1.4a | 28.0 ± 2.8 |
| 4 | 56.0 ± 5.7a | 11.0 ± 1.4a | 67.0 ± 4.2 |

TABLE 3-continued

| | Mean cumulative trap rate and standard deviation (%) | | |
|---|---|---|---|
| Exposure time (hour) | Peak wavelength: 365 nm (radiant flux: 500 mW, UV converted into surface light) | Peak wavelength: 340 nm (radiant flux: 500 mW, UV converted into surface light) | Total |
| 8 | 79.0 ± 7.1a | 14.0 ± 0.0b | 93.0 ± 7.1 |
| 12 | 84.0 ± 2.8a | 16.0 ± 2.8b | 100.0 ± 0.0 |

In summary, a trapping rate was measured on two Luralite traps (radiant flux: 500 mW) equipped with a UV LED emitting UV light with a peak wavelength of 340 nm and a UV LED emitting UV light with a peak wavelength of 365 nm, respectively, (wherein light from each of the light sources was converted into surface light) inside a screened enclosure containing 50 houseflies in a dark laboratory for a total of 12 hours from morning, and there were two replicates in total under the same conditions except that the positions of the traps were exchanged.

In Table 3, 1) means that, in a corresponding row, there was no significant difference in trapping rate between the two traps (p>0.05; paired t-test using SPSS PC software).

As shown in Table 3, upon exposure to UV for 8 hours and 12 hours, the UV LED (radiant flux: 500 Mw) emitting surface light with a peak wavelength of 365 nm exhibited a higher housefly trapping rate than the UV LED (radiant flux: 500 Mw) emitting surface light with a peak wavelength of 340 nm. Therefore, it can be seen that UV light with a peak wavelength of 365 nm has higher trapping efficacy than UV light with a peak wavelength of 340 nm.

Based on the above experimental results, in the present invention, a UV LED 20 emitting UV light with a peak wavelength of 365 nm is used as a light source. It should be understood that a UV LED emitting UV light with a peak wavelength of about 360 nm to about 370 nm is expected to have an equivalent effect.

Figure 8:
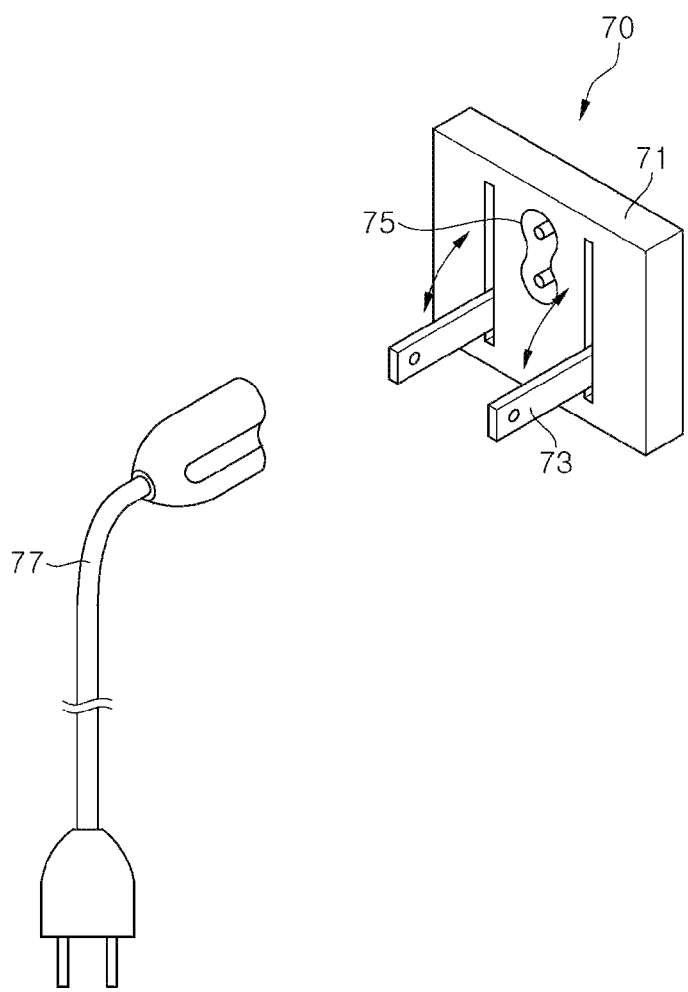
FIG. 8 is a perspective view of a power connector of an insect trap according to the present invention.

FIG. 8 is a perspective view of a power connector of an insect trap according to the present invention.

In FIG. 2 to FIG. 5, the frame 71 constituting the power connector 70 of the insect trap is shown as distinct from the body 10. This is intended to show that the power connector 70 of the insect trap can be separated from the body 10. The frame 71 is detachably mounted on the body 10. The frame 71 is provided with the plug 73 for electrical connection to a wall receptacle. Specifications of the plug 73 vary from country to country. According to the present invention, it is possible to easily cope with power specifications varying from country to country simply by mounting the frame 71 provided with the plug 73 meeting power specifications in each country on the body 10. In addition, the plug is configured to be moveable between a position at which the plug is embedded in the frame 71 and a position at which the plug protrudes from the frame.

In this way, when there is a wall receptacle, installation of the insect trap is completed by putting the plug 73 into the wall receptacle.

When there is no wall receptacle at a desired position, electric power may be supplied to the insect trap through an extension cable. The insect trap is provided with an electrical connection into which the extension cable is plugged. With the extension cable plugged into the electrical connection, the insect trap can be installed far from a receptacle. In addition, with the plug 73 embedded in the frame, the insect trap may be mounted on a wall using the hanger loop 25 (see FIG. 1). The electrical connection 75 may be formed in the frame 71, as shown in FIG. 7.

Figure 9:
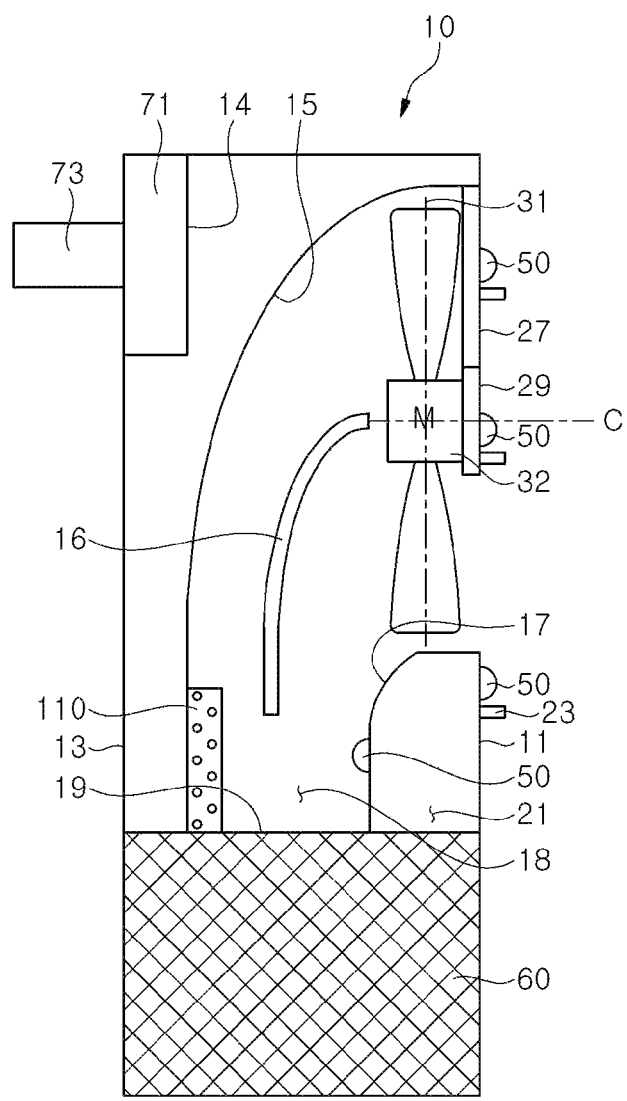
FIG. 9 is a sectional view of an insect trap according to a fifth embodiment of the present invention.

FIG. 9 is a sectional view of an insect trap according to a fifth embodiment of the present invention. An insect trap according to the fifth embodiment may be substantially the same as the insect trap according to any one of the first to fourth embodiments of the present invention except that at least of the first streamlined inner surface 15 and the second streamlined inner surface 17 contains a photocatalyst 110 and a UV LED 50 emitting light to the photocatalyst 110 is further provided.

The photocatalyst 110 may include a material that induces a photocatalytic reaction, for example, titanium dioxide ($TiO_2$), silicon dioxide ($SiO_2$), tungsten oxide ($WO_3$), zirconium oxide (ZnO), strontium titanium oxide ($SrTiO_3$), niobium oxide ($Nb_2O_5$), iron oxide ($Fe_2O_3$), zinc oxide ($ZnO_2$), and tin oxide ($SnO_2$). For example, the photocatalyst 110 may be provided in the form of a photocatalytic filter having a layered structure including titanium oxide ($TiO_2$). Here, the photocatalytic filter may be fabricated by coating the photocatalyst 110 onto a material that is permeable to air, such as metal foam or porous ceramic.

The UV LED 50 configured to emit light toward the photocatalyst 110 may emit UV light at a wavelength of about 200 nm to about 400 nm. When UV light is absorbed by the photocatalyst 110, electrons (e) and holes (+) are generated. The electrons and the holes can remove pollutants in air via a redox reaction with the pollutants.

In addition, the photocatalyst 110 generates hydroxyl radicals via the photocatalytic reaction. Here, the hydroxyl radicals are a strong oxidizing agent and serve to oxidize and decompose organic pollutants and odorous substances in the air taken into the insect trap to convert the organic pollutants and odorous substances into water and carbon dioxide. Carbon dioxide is known to be highly effective in attracting mosquitoes.

That is, with the photocatalyst 110 and the UV LED 50 configured to emit light to the photocatalyst 110, the insect trap according to the fifth embodiment can deodorize and sterilize air therearound, while exhibiting further improved pest luring efficacy through generation of carbon dioxide.

Figure 10:
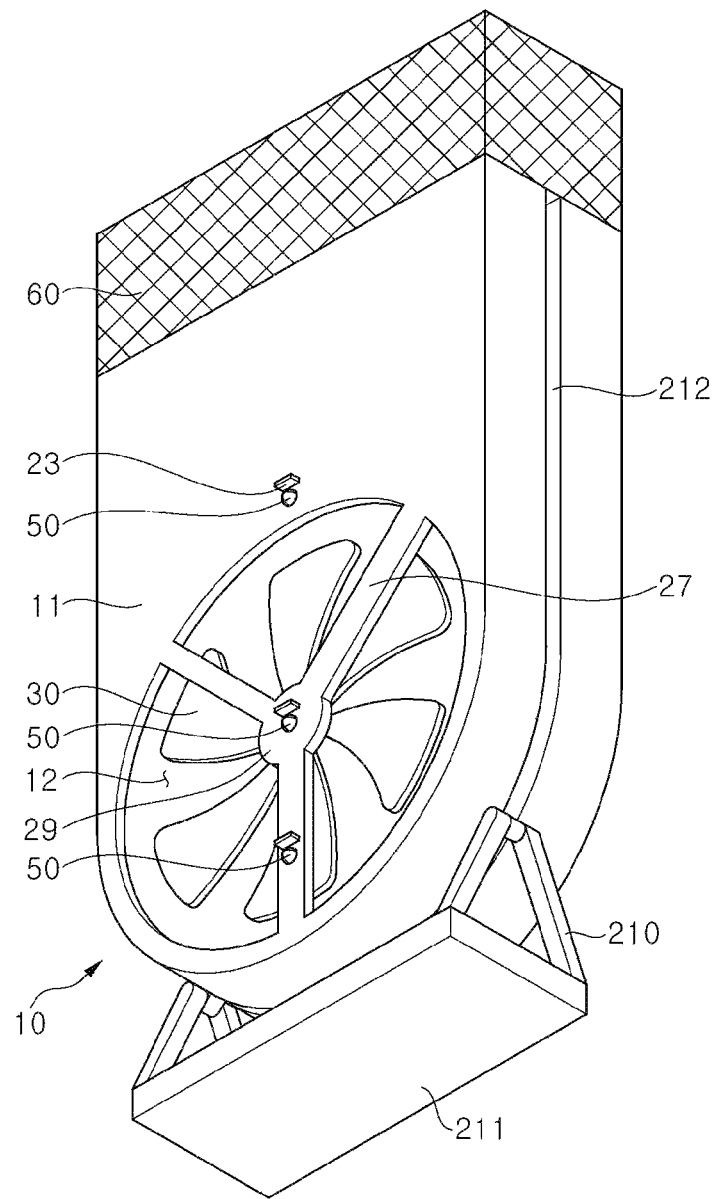
FIG. 10 is a perspective view of an insect trap according to a sixth embodiment of the present invention.
Figure 11:
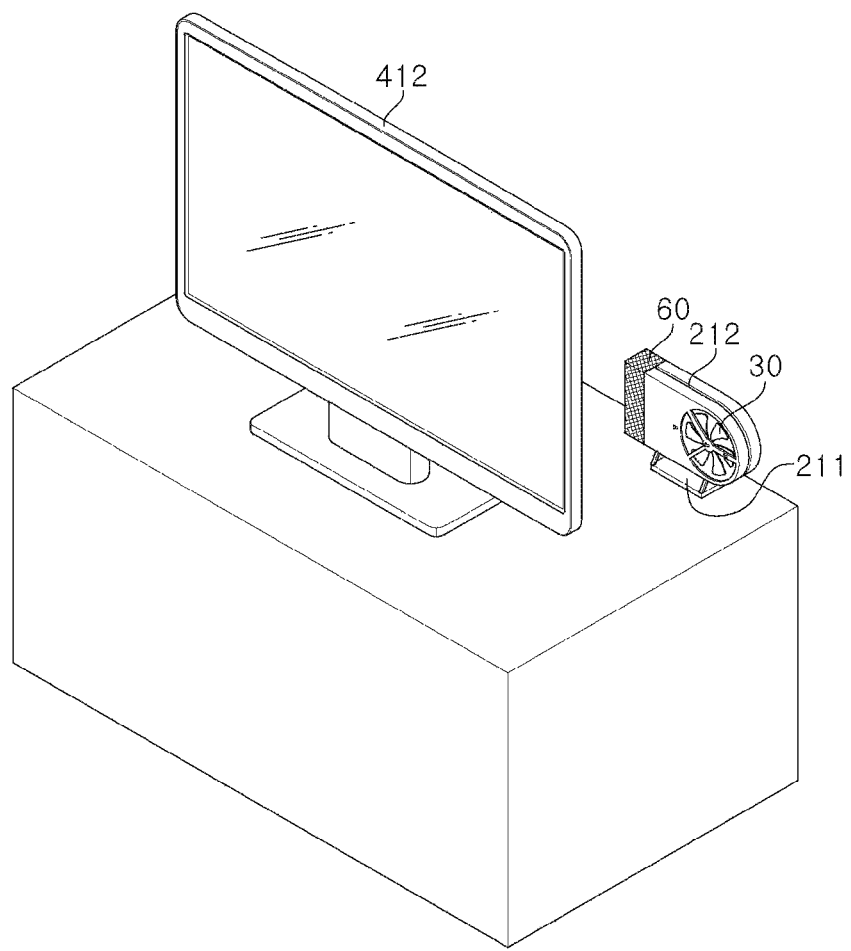
FIG. 11 is a view of the insect trap of FIG. 10 in use.

FIG. 10 is a perspective view of an insect trap according to a sixth embodiment of the present invention and FIG. 11 is a view of the insect trap of FIG. 10 in use. An insect trap according to the sixth embodiment may be substantially the same as the insect trap according to any one of the first to fifth embodiments of the present invention except that support legs 210 are provided to support the body 10 and a guide rail 212 is formed on an outer surface of the body 10 to guide the support legs 210.

The support legs 210 extend from the body 10 and are movable on the outer surface of the body 10 along the guide rail 212 formed on the outer surface of the body 10. Accordingly, a user can install the insect trap in various forms depending on installation conditions to improve pest trapping efficacy. The insect trap may further include a support plate 211 connected to one end of each support leg 210 to be stably supported on the ground. Accordingly, since the insect net 60 does not need to be placed on the ground to support the body, the insect net 60 may be provided as a disposable insect net formed of cotton yarn, vinyl, or the like.

For example, referring to FIG. 11, with the support legs 210 disposed such that the suction portion 12 is horizontal to the insect net 60, the suction portion 12 may be placed near a portion of a household appliance 412 from which heat is generated, thereby improving pest luring efficacy. That is, the support legs 210 are movable on the outer surface of the body such that the suction portion can be placed at a location suitable for utilizing various household appliances, thereby improving pest luring efficacy.

Figure 12:
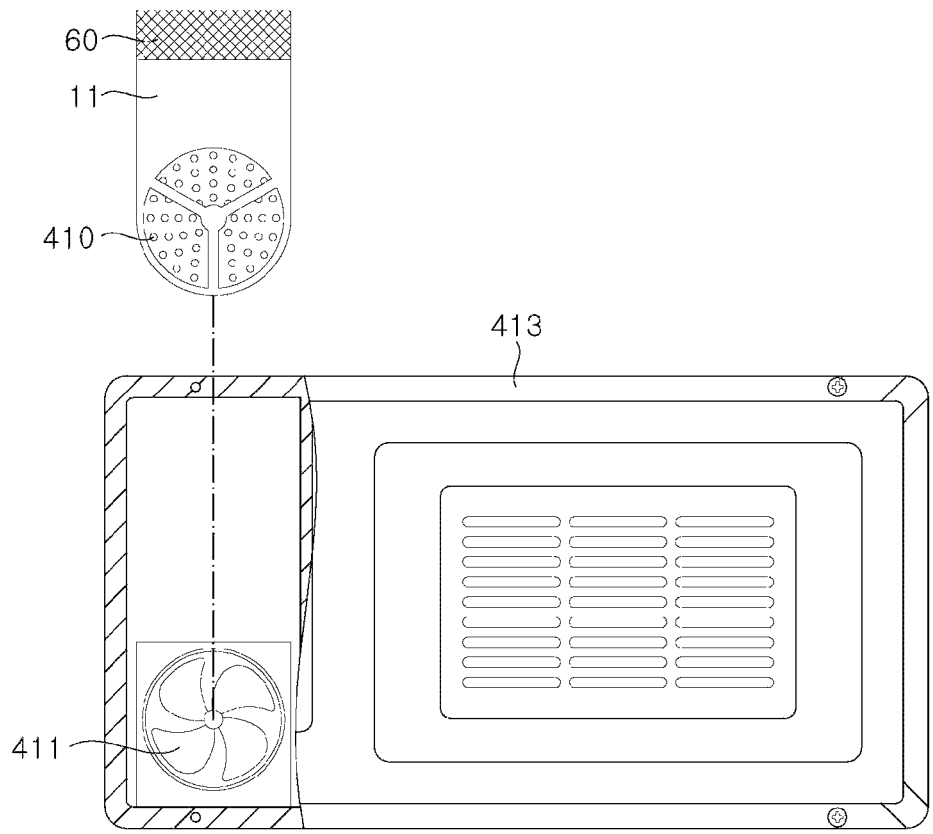
FIG. 12 and FIG. 13 show an insect trap according to a seventh embodiment of the present invention and a state in which the insect trap is in use.
Figure 13:
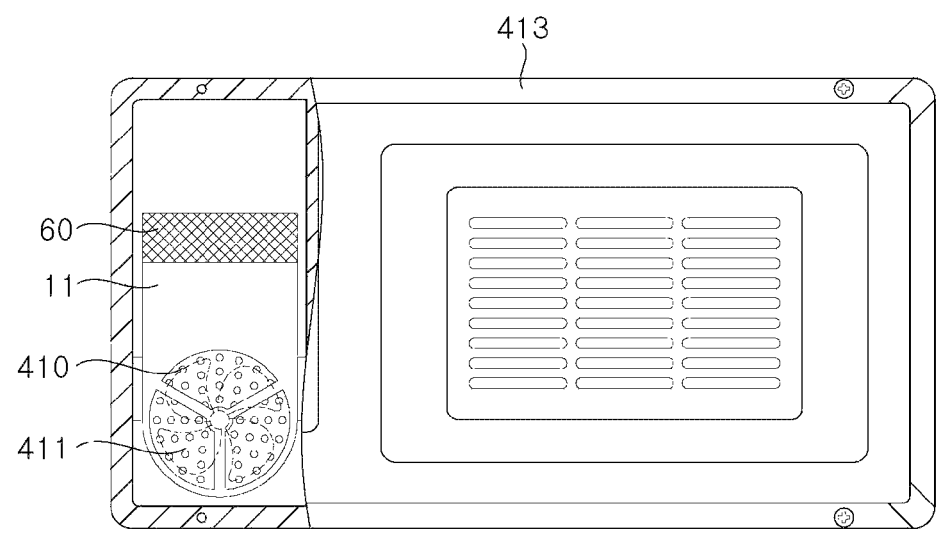

FIG. 12 and FIG. 13 show an insect trap according to a seventh embodiment of the present invention and a state in which the insect trap is in use. An insect trap according to the seventh embodiment may be substantially the same as the insect trap according to any one of the first to sixth embodiments of the present invention except that the fan 30 is omitted.

The insect trap according to this embodiment includes at least one air vent hole 410 formed through the back surface of the body 10 corresponding to the suction portion 12. The insect trap may be installed at a portion of a household appliance (e.g., a microwave oven, a refrigerator, a computer, or the like) at which a fan 411, for example, a cooling fan is disposed, with the back surface of the body 10 placed against that portion.

In other words, despite being free from the fan 30, the insect trap according to this embodiment is installed as close as possible to the household appliance 413 such that insect pests can be trapped in the insect net 60 by a suction air flow generated by the fan 411 of the household appliance 413, thereby remarkably reducing power consumption while improving pest trapping efficacy using heat generated by the household appliance 413.

Figure 14:
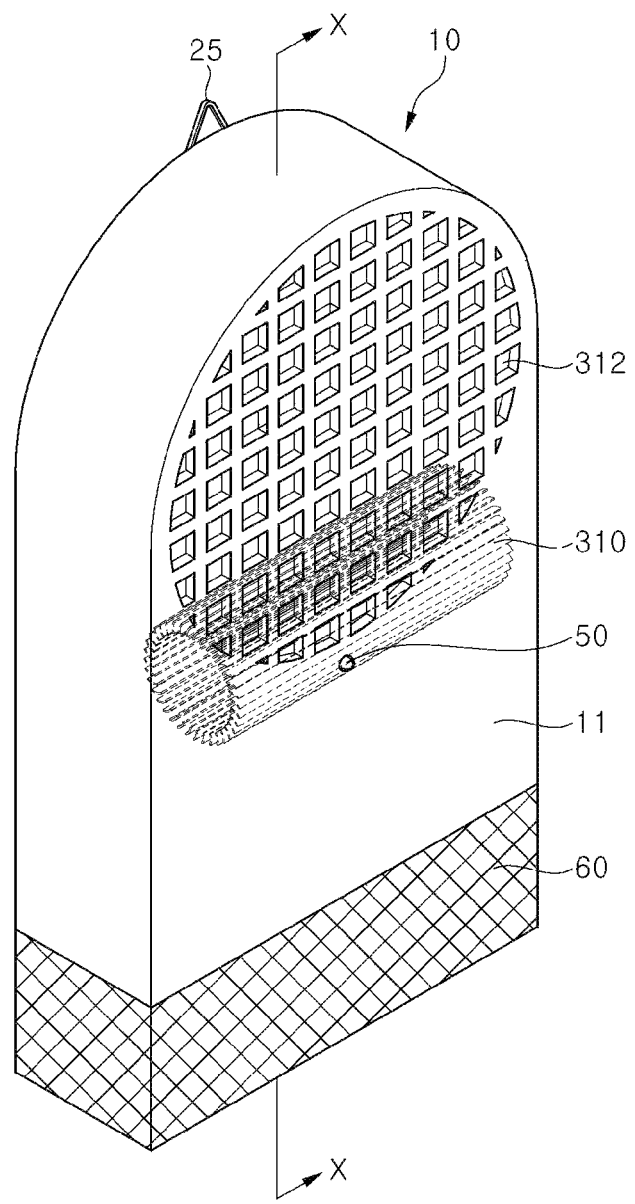
FIG. 14 is a perspective view of an insect trap according to an eighth embodiment of the present invention.
Figure 15:
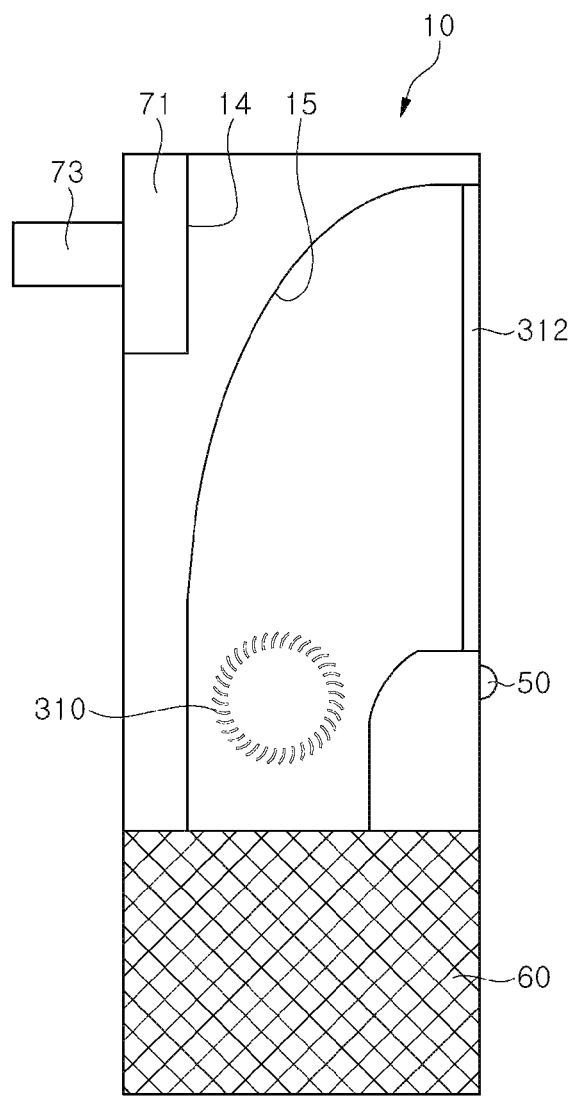
FIG. 15 is a sectional view taken along line X-X of FIG. 14.
Figure 16:
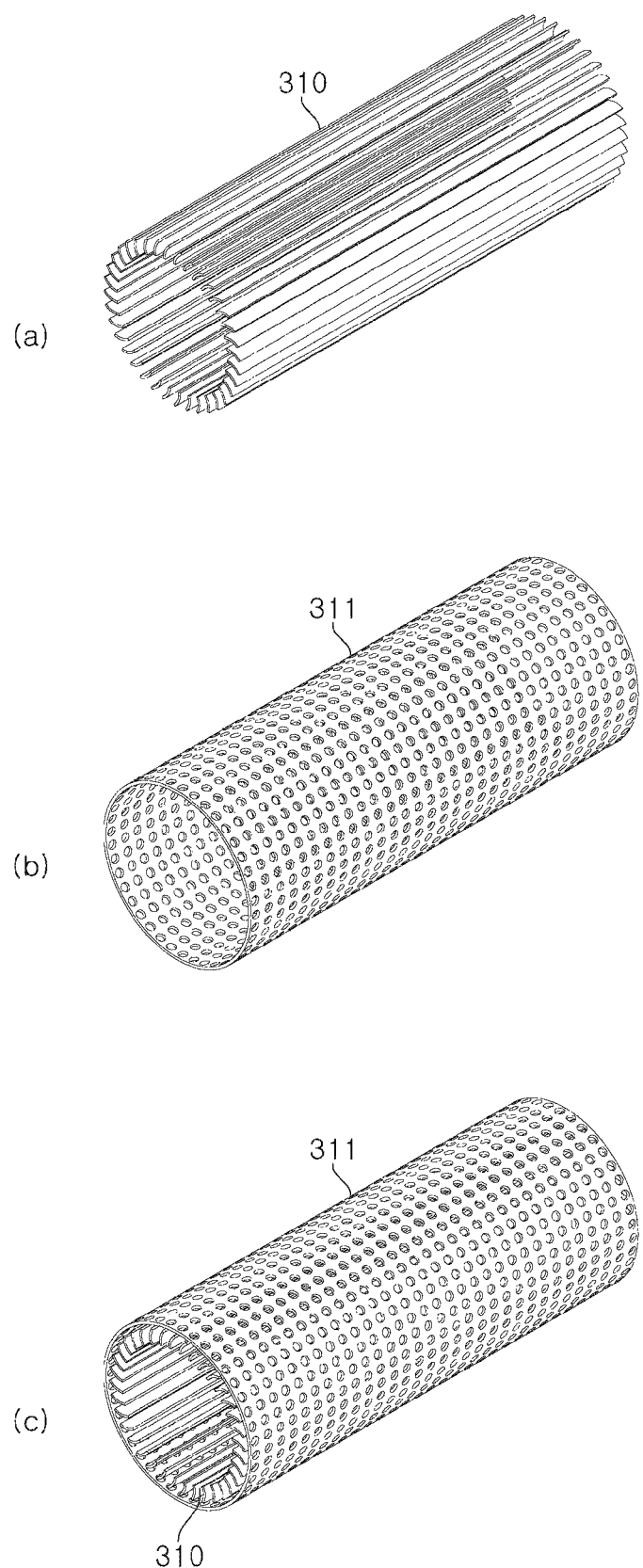
FIG. 16 shows a cross fan and a mesh cylinder of an insect trap according to the present invention.

FIG. 14 is a perspective view of an insect trap according to an eighth embodiment of the present invention, FIG. 15 is a sectional view taken along line X-X of FIG. 14, and FIG. 16 shows a cross fan 310 and a mesh cylinder 311 used in an insect trap according to the present invention. An insect trap according to the eighth embodiment may be substantially the same as the insect trap according to any one of the first to sixth embodiments of the present invention except that the cross fan 310 is used instead of the fan 30.

In this embodiment, the cross fan 310 is provided to the slim and space-saving insect trap to generate a hydrodynamically efficient air flow inside the duct 18, thereby improving pest trapping efficacy. A motor (not shown) that provides torque to the cross fan 310 may be any known motor for cross fans 310 and may be disposed on a side surface of the body 10.

The cross fan 310 may include 20 to 40, for example, 24 to 36, vanes and may be rotated at 2,000 rpm to 3,500 rpm, for example, at 2,100 rpm to 3,000 rpm. If the number of vanes is less than 20 or the cross fan 310 has an rpm of less than 2,000, the pest trapping efficacy can be reduced, whereas, if the number of vanes exceeds 40 or the cross fan 310 has an rpm of more than 3,500, too many bodies of dead pests are likely to stick to the cross fan 310, or noise above 38 dBA can be generated.

Insect pests, especially mosquitoes, tend to stop flying and float in a stream of air at a wind speed of 0.8 m/s or more. If the speed of an air flow generated by the cross fan 310 is less than 0.5 m/s, the insect trap cannot efficiently suck insects therein. If the speed of an air flow generated by the cross fan 310 exceeds 3 m/s, insects are likely to attempt to escape or loud noise can be generated. Thus, it is desirable that the speed of the air flow generated by the cross fan 310 range from 0.5 m/s to 3 m/s. When the rpm and number of vanes of the cross fan 310 fall within the ranges set forth above, the insect trap can force insect pests to stop flying and to be trapped in the insect net with a high degree of efficiency, while preventing the insect pests from sticking to the cross pan 300.

Referring to FIG. 16, the insect trap may further include the mesh cylinder 311 surrounding the cross fan 310 and having a plurality of pores.

The mesh cylinder 311 may have a pore diameter of 1 mm to 3 mm. Within this range, the mesh cylinder 311 can prevent insect pests, particularly mosquitoes, from passing therethrough without interfering with generation of an air flow.

That is, with the mesh cylinder 311 having a pore size of 1 mm to 3 mm to prevent insect pests, particularly mosquitoes, from passing therethrough without interfering with generation of an airflow, the insect trap can prevent the insect pests from sticking to the cross fan 310, thereby preventing generation of noise or deterioration in durability of the motor due to physical impact on the cross fan 310.

Referring to FIG. 14, in the insect trap according to this embodiment, the suction portion 12 may be provided in the form of an air vent hole 312 capable of preventing large winged insects such as butterflies from being drawn into the body, thereby preventing generation of noise or deterioration in durability of the motor.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Further, it should be understood that, although effects of a certain component of the present invention are not clearly stated in description of the embodiments, predictable effects of that component are also recognized.

LIST OF REFERENCE NUMERALS

10: body
11: front surface
12: air suction portion
13: back surface
14: fastener
15: first streamlined inner surface
16: guide vane
17: second streamlined inner surface
18: duct
19: outlet
21: space
23: shielding surface
25: hanger loop
27: support bar
29: center support
30: fan
31: intake surface
32: motor
a: tilt angle
c: height of center of fan
50: UV LED
55: lens
j: vertical radiation angle
k: horizontal radiation angle
60: insect net
70: power connector
71: frame
73: plug
75: electrical connection
77: extension cable
110: photocatalyst
210: support leg
211: support plate
212: guide rail
310: cross fan
311: mesh cylinder
312: insect passage hole
410: air vent hole
411: fan of household appliance
412, 413: household appliance

The invention claimed is:

1. An insect trap comprising:
a body having a front surface and a back surface that are opposite to each other;
a suction portion formed through the front surface of the body and having a diameter greater than a distance between the front surface and the back surface of the body;
a fan disposed behind the suction portion;
at least one ultraviolet light emitting diode (UV LED disposed on the body at least around the fan;
a discharge portion through which air taken into the body through the suction portion is discharged in a direction different from an air suction direction of the suction portion;
a duct disposed inside the body to provide an air flow path from the suction portion to the discharge portion and having
a first streamlined inner surface disposed between the front surface and the back surface of the body and having i) an upper portion extending from a top of the duct to a portion of the duct that is located below a rotation center of the fan and ii) a lower portion located below the upper portion, wherein the upper portion of the first streamlined inner surface has a curved shape to change a direction of the air taken into the body through the suction portion toward an insect net; and
the insect net provided to the discharge portion to allow air to pass therethrough while allowing insects taken in along with air to be caught thereby.

2. The insect trap according to claim 1, further comprising:
at least one streamlined guide vane disposed at a predetermined distance from the first streamlined inner surface in the extension direction of the duct, the streamlined guide vane being configured to divide and guide the air taken into the body through the suction portion.

3. The insect trap according to claim 1, further comprising:
a second streamlined inner surface formed in the body and at a side of the first streamlined inner surface to guide the air taken into the body through the suction portion toward the insect net.

4. The insect trap according to claim 3, wherein at least one of the first streamlined inner surface and the second streamlined inner surface contains a photocatalyst and the insect trap further comprises a UV LED emitting light toward the photocatalyst.

5. The insect trap according to claim 1, wherein the front surface of the body is wider than a distance between the front surface and the back surface of the body.

6. The insect trap according to claim 1, wherein a suction surface of the fan faces in a forward direction or is tilted at an angle of 30 degrees or less with respect to the forward direction.

7. The insect trap according to claim 1, wherein the fan has a larger diameter than the distance between the front surface of the body and the back surface of the body.

8. The insect trap according to claim 1, wherein the fan has a rotary shaft horizontally disposed on the front surface of the body and vanes vertically arranged.

9. The insect trap according to claim 1, further comprising:
a shielding surface disposed around the UV LED to prevent UV light emitted from the UV LED from directly traveling downward.

10. The insect trap according to claim 1, further comprising:
a lens disposed in front of the UV LED to allow UV light from the UV LED to be radiated over a wider angle in a horizontal direction of the UV LED than in a vertical direction of the UV LED.

11. The insect trap according to claim 1, wherein the body is provided with a power connector having a plug, the plug being movable between a position at which the plug is embedded in the body and a position at which the plug extends rearward of the body.

12. The insect trap according to claim 1, wherein the body is provided with a power connector detachably mounted on the body.

13. The insect trap according to claim 1, further comprising:
support legs supporting the body; and
a guide rail formed on an outer surface of the body to guide the support legs.

14. The insect trap according to claim 1, wherein the lower portion of the first streamlined inner surface has a non-curved shape.

15. An insect trap comprising:
a body having a front surface and a back surface;
a suction portion formed through the front surface of the body;
a fan disposed behind the suction portion;
at least one ultraviolet light emitting diode (UV LED) disposed on the body around the fan;
a discharge portion through which air taken into the body through the suction portion is discharged;
a duct defining an air flow path from the suction portion to the discharge portion; and
an insect net provided to the discharge portion to allow air to pass therethrough while allowing insects taken in along with air to be caught thereby;
a first streamlined inner surface extending from a top of the duct to a portion of the duct that is located below a rotation center of the fan and having a curved shape configured to change a direction of the air taken into the body through the suction portion toward the inset net; and
at least one streamlined guide vane disposed inside the body to be located at a predetermined distance from the first streamlined inner surface and having a curved shape extending in the downward direction from the portion of the duct that is below the rotation center of the fan toward the insect net,
wherein the front surface of the body is wider than a distance between the front and back surfaces of the body, and the fan comprises a rotary shaft horizontally disposed on the front surface of the body and vanes vertically arranged.

16. The insect trap according to claim 15, wherein the body is provided with a power connector having a plug, the plug being movable between a position at which the plug is embedded in the body and a position at which the plug extends rearward of the body.

17. The insect trap according to claim 15, further comprising:
support legs supporting the body; and
a guide rail formed on an outer surface of the body to guide the support legs.

* * * * *